United States Patent [19]

Okamura et al.

[11] Patent Number: 4,954,461
[45] Date of Patent: Sep. 4, 1990

[54] HIGH PURITY AND HIGH STRENGTH INORGANIC SILICON NITRIDE CONTINUOUS FIBER

[75] Inventors: Kiyohito Okamura, Mito; Mitsuhiko Sato; Yoshio Hasegawa, both of Higashi-Ibaraki; Tadao Seguchi, Fujioka; Shunichi Kawanishi, Takasaki, all of Japan

[73] Assignee: Japan Atomic Energy Research Institute, Tokyo, Japan

[21] Appl. No.: 170,184

[22] Filed: Mar. 18, 1988

[30] Foreign Application Priority Data

Mar. 20, 1987 [JP]   Japan ................................ 62-67391

[51] Int. Cl.$^5$ .................... C04B 35/58; C01B 21/063; C01B 33/06
[52] U.S. Cl. ...................................... 501/95; 423/344; 501/97

[58] Field of Search ..................... 423/344; 501/97, 95

[56] References Cited

U.S. PATENT DOCUMENTS 3,892,583   7/1975   Winter et al. ......................... 106/55
4,543,344   9/1985   Cannady .............................. 423/344

OTHER PUBLICATIONS

Okamura, K. et al., *Ceramics International*, 13,55 (1987).

Primary Examiner—Robert L. Stoll
Assistant Examiner—Lori F. Cuomo
Attorney, Agent, or Firm—Sughrue, Mion, Zinn, Macpeak & Seas

[57] ABSTRACT

A high purity and high strength inorganic silicon nitride continuous fiber substantially composed of Si and N with excellent properties can be provided. A method of producing the fiber is also disclosed.

1 Claim, 2 Drawing Sheets

HIGH PURITY AND HIGH STRENGTH INORGANIC SILICON NITRIDE CONTINUOUS FIBER

BACKGROUND OF THE INVENTION

1. Field of the Invention

The present invention relates to an improved novel inorganic silicon nitride continuous fiber composed of Si and N, and a method of producing the same.

2. Related Art Statement

Silicon nitride, which is a Si-N series inorganic compound, has been synthesized by various method from long ago. Among the various methods, high purity silicon nitrides can be obtained by a vapor phase reaction, a flux method, or a thermal decomposition of silicon diimide, as disclosed by Kijima et al in J. Am. Cer. Soc., Vol.56, p.340 (1973), Kijima et al in J. Cryst. Growth, Vol.24/25, p.183 (1974), Inomata et al in J. Cryst. Growth, Vol.21, p.318 (1974), and Mitomo et al in Journal of The Ceramic Society of Japan, Vol.82, p.144 (1974).

However, silicon nitride has been obtained in the form of powder or whisker solely, and not in the form of a continuous fiber. A continuous inorganic fiber containing the component N is produced by firing a polycarbosilane fiber in an inert atmosphere, as described in West German Patent No. 2218960 Specification. However, in this case, a fiber composed solely of Si and N is not obtained, and a fiber containing a large amount of C intermingled therein is obtained, which large amount of C causes a phase separation, various reactions, etc. at high temperature to deteriorate the characteristic properties of the fiber.

Summary of the Invention

A purpose of the present invention is to synthesize a high purity and high strength continuous inorganic silicon nitride fiber composed of Si and N having excellent characteristic properties.

Another object of the present invention is to provide the novel continuous inorganic silicon nitride fiber.

A further object of the present invention is to provide a novel method of producing the continuous inorganic silicon nitride fiber.

The inventors made many studies and researches leading to the present invention to find out that the above purpose can be achieved by using an organic silicon polymer such as polycarbosilane, polysilazane, etc. as a precursor, preparing a fiber of the precursor, irradiating the fiber in vacuo or an non-oxidizing atmosphere by an ionizing radiation beam of a dose of $5 \times 10^7 - 9 \times 10^9$ rad, firing the irradiated fiber in an ammonia gas stream at 800°-1,700° C. to completely nitride and thermally decompose the irradiated fiber without harming or damaging the shape of the fiber during the thermal decomposition of the precursor fiber.

The product of the present invention is a high purity continuous inorganic silicon nitride fiber substantially solely composed of Si and N. The fiber has a characteristic feature that it is made of an amorphous material substantially solely composed of Si and N, or fine crystals of $\alpha$-Si$_3$N$_4$, or fine $\alpha$-Si$_3$N$_4$ crystals uniformly distributed in the amorphous matrials.

The method of producing the high purity and high strength continuous inorganic silicon nitride fiber substantially composed of Si and N of the present invention, comprises the steps of, producing an organic silicon high polymer which is polycarbosilane mainly of Si-C skeleton structure and having a molecular weight (M.W.) of 800-50,000 or polysilazane mainly of Si-N skeleton structure having an M.W. of 600-30,000, preparing a spinning solution of the polycarbosilane or polysilazane and spinning the solution to prepare a fiber, irradiating the fiber under tension or non-tension in vacuo or an non-oxidizing atmosphere by an ionizing radiation beam of a dose of $5 \times 10^7 - 9 \times 10^9$ rad, firing the irradiated fiber under tension or non-tension in an ammonia gas stream at a temperature of 800°-1,700° C., and optionally refiring the fired fiber in an inert atmosphere at a temperature exceeding the firing temperature at the firing step and not exceeding 1,700° C.

Brief Description of the Drawings

For a better understanding of the present invention, reference is made to the accompanied drawings, in which.

Detailed Explanation of the Invention

Figure 1:
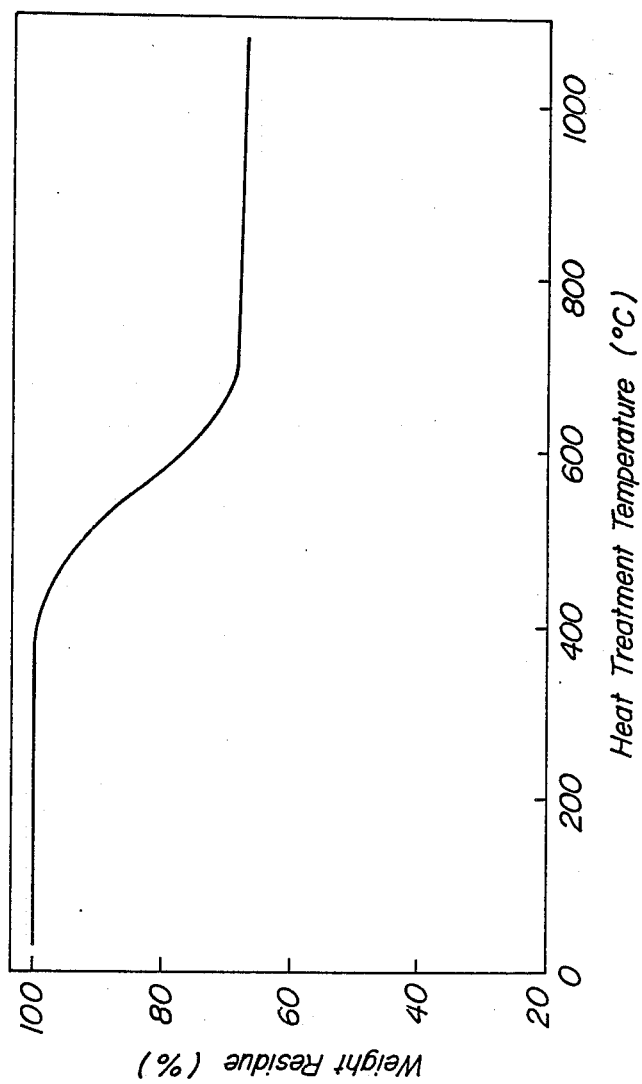
FIG. 1 is a characteristic graph showing a relation between heating temperature and weight residue in % due to thermal decomposition of a polycarbosilane fiber, when the polycarbosilane fiber irradiated in helium gas stream at a dose of $7.5 \times 10^8$ rad is heated in an ammonia gas stream as described in Example 2.

The continuous inorganic fiber substantially composed of Si and N of the present invention can be produced by a synthesis using either of polycarbosilane or polysilazane, as a starting material.

The method of the present invention will be explained hereinbelow, in the sequence of steps order.

(First step) Step of producing the starting material:

The step produces the starting material polycarbosilane mainly of Si-C skeleton structure. Such process of producing the polycarbosilane is disclosed, for example, by G. Fritz et al in Z. Anog. Allg. Chem., Vol.321, p.10 (1963), Angew. Chem., Vol.79, p.657 (1967), and Advan. Inorg. Chem. Radiochem., Vol.7, p.349 (1965), more particularly in Japanese Patent Application Laid-open No. 51-126,300, Japanese Patent Application Laid-open No. 52-74,000, Japanese Patent Application Laid-open No. 52-112,700, Japanese Patent Application Laid-open No. 54-61,299, and Japanese Patent Application Laid-open No. 57-16,029. Either of the processes can be used for preparing the polycarbosilane.

Alternatively, the step produces the starting material polysilazane mainly made of Si-N skeleton structure. Such process of producing the polysilazane is disclosed, for example, by K. A. Andrianov in Vysokomolekul. Soedin., Vol.4, p.1060 (1962), E. G. Rochow in Monatsh. Chem., Vol.95, p.750 (1964), W. Fink in Angew. Chem., Vol.78, p.803 (1966), U. Wannagat in Fortsch. Chem. Forsh., Vol.9, p.102 (1967), and B. J. Aylett in Organometal. Chem. Rev., Vol.3, p.151 (1968). Either of the processes can be used for preparing the polysilazane.

This step may be omitted, if polycarbosilane or polysilazane according to the present invention is available commercially in the market. (Second step) Step of spinning:

The step prepares a spinning solution by heating and melting polycarbosilane or polysilazane as obtained in the above step, filters thus obtained spinning solution to remove impurities and other harmful substances which affect adverse influences on spinning, and spins a fiber through a conventional spinning apparatus used for spinning a synthetic fiber. A temperature of the spinning solution in case of spinning varies depending on a softening temperature of the polycarbosilane or polysilazane used as a starting material, but, the temperature is preferably 50°–400° C. The spinning apparatus may be provided with a spinning cylinder, and the atmosphere of the spinning cylinder may be replaced by at least one atmosphere selected from the group consisting of air, inert gases, steam and ammonia gas, if necessary, and a thin fiber may be obtained by increasing the winding-up speed of the spun fiber through the spinning cylinder. The spinning speed in the above melt spinning varies depending on an average molecular weight, a molecular weight distribution, and a molecule structure of the starting material polycarbosilane or polysilazane. A spinning speed in a range of 50–5,000 m/min brings about an advantageous effect.

The spinning step may be effected by an alternative way of preparing a spinning solution of polycarbosilane or polysilazane in at least one solvent such as benzene, xylene, toluene or other solvent which can solve polycarbosilane or polysilazane, filtering the spinning solution to remove microgels, impurities and other substances harmful to spinning, spinning a fiber from the spinning solution through a conventional apparatus for spinning a synthetic fiber by a dry spinning process, and increasing the winding-up speed of the fiber to obtain the aimed thin fiber. This way is suited particularly to a spinning of such polycarbosilane or polysilazane that dose not melt by heating.

In such dry spinning process, if necessary, the spinning apparatus may be provided with a spinning cylinder, and the atmosphere of the spinning cylinder may be replaced by a mixed atmosphere of air or an innert gas and a vapor of at least one of the above solvent, or by an atmosphere of air, an inert gas, steam, ammonia gas, hydrocarbon gas or an organic silicon compound gas, and the solidifying speed of the spun fiber in the spinning cylinder may be regulated. (Third step) Step of irradiation:

The spun fiber obtained by the above step is irradiated by an ionizing radiation beam of a dose of $5 \times 10^7 - 9 \times 10^9$ rad under tension or non-tension in vacuo or in a non-oxidizing atmosphere. An aim of this step is to prevent melting of the fiber in the succeeding firing step. This treating step is called melting preventing treatment step.

If the spun fiber in vacuo or in an non-oxidizing atmosphere is irradiated by an ionizing radiation beam, side chains of polycarbosilane or polysilazane mainly constituting the spun fiber are severed, and the formed radicals react with each other or eliminate hydrogen immediately or after preserved for a long time. The elimination of hydrogen or recombination of the molecule radicals produces mainly methane gas or hydrogen gas, and the gases are emitted out of the fiber. Recombination of high molecule radicals produces crosslinkings, thereby polycarbosilane or polysilazane forming the fiber is high molecularized without harming or damaging the shape of the fiber. By virtue of the high molecularization, the spun fiber does not melt or adhere to the adjacent fiber, even if they are contacted with each other in the next firing step.

Atmosphere in the irradiation step is preferably vacuum or a non-oxidizing atmosphere such as helium, argon, nitrogen, ammonia, hydrogen, etc. If the irradiation is effected in an oxidizing atmosphere such as oxygen, there arises a situation occasionally that a large amount of oxygen is introduced in the spun fiber, and the oxygen remains in the fiber after the subsequent firing step thereby producing an Si-N-O series inorganic fiber, thereby not giving the characteristic property of the high purity inorganic fiber composed solely of Si and N. Thus, the irradiation of the fiber by the ionizing radiation beam is preferably effected in vacuum or an non-oxidizing atmosphere.

Even if the spun fiber is irradiated by an ionizing radiation beam in a non-oxidizing atmosphere, a portion of the high molecule radicals produced in the spun fiber as described above remains considerably stable. Therefore, a situation sometimes occur that, when transporting the irradiated fiber to environmental air atmosphere from the non-oxidizing atmosphere, oxygen in the air reacts with a portion of the stable high molecule radicals to incorporate oxygen in the fiber, and the oxygen remains in the fiber even after the succeeding firing step. However, the amount of the oxygen remaining in the fiber in such situation is an impurities order of an O/Si atoms ratio of 0.04 or less, so that it almost does not affect the characteristic properties of the inorganic fiber composed of Si and N.

For the case of using $\gamma$-ray as the irradiation beam, the dose of the irradiation is preferably $5 \times 10^7 - 9 \times 10^9$ rad. If the dose is less than $5 \times 10^7$ rad, the above-described high molecularization of polycarbosilane or polysilazane due to the irradiation of the $\gamma$-ray etc. becomes insufficient, and the irradiated fibers are occasionally melted and adhered to each other in the subsequent firing step, so that the dose is preferably $5 \times 10^7$ rad or more for the case of $\gamma$-ray, etc.

For the case of using electron beam as the irradiation beam, the dose is preferably $5 \times 10^7 - 9 \times 10^9$ rad. If the dose is less than $5 \times 10^7$ rad, the aforedescribed high molecularization of polycarbosilane or polysilazane due to the irradiation of the electron beam becomes insufficient, and the irradiated fibers occasionally melted and adhered to each other in the subsequent firing step, so that the dose is preferably $5 \times 10^7$ rad or more for the case of electron beam. While, the irradiation dose of above $9 \times 10^9$ rad is not preferable, because, at such high dose, the irradiated fiber is degraded or deteriorated, so that a high strength silicon nitride fiber can not be obtained.

When effecting the irradiation of the fiber by an electron beam, the irradiated fiber emits some extent of heat, because it is heated by the irradiation beam. Therefore, when the spun fiber is irradiated by an electron beam of a high dose, the heat emission of the fiber has to be taken into consideration, so that the spun fiber is mounted on a table sufficiently cooled by air or water, or the fiber is placed in a stream of a non-oxidizing gas such as helium, argon, nitrogen, ammonia or hydrogen, or the spun fiber is mounted on the sufficiently cooled table in the non-oxidizing atmosphere. The cooling is effected only to such an extent that the spun fiber does not melt due to the heating of the fiber caused by the irradiation of the electron beam, so that the cooling is not necessarily effected, if the heat emission of the fiber is small.

If the irradiation of the fiber is effected under non-tension state, the spun fiber assumes waves shape due to its shrinkage. The waves shape may sometimes be corrected in the next firing step, so that the tension is not always necessary. If a tension is exerted on the spun fiber, a small tension power is sufficient, which is at least larger than that required for preventing the possible formation of the wave-shaped fiber due to shrinkage in the melting-preventing treatment. Usually, a good result can be obtained, if a tension power in a range of 0.001–0.5 kg/mm$^2$ is exerted on the spun fiber.

If the tension power is less than 0.001 kg/mm$^2$, a sufficient tension to prevent a sag of the fiber can not be given to the spun fiber, so that the purpose of the present invention can not be achieved because of the insufficient tension. While, if a tension power exceeding 0.5 kg/mm$^2$ is exerted on the spun fiber, the tension power is so large that the spun fiber is occasionally severed. Therefore, the tension power in the range of 0.001–0.5 kg/mm$^2$ is preferable. (Fourth step) Step of firing:

In this firing step, the melting-prevented fiber as produced above is fired by heating to a temperature of 800°–1,700° C. to produce the inorganic silicon nitride continuous fiber composed of Si and N.

The firing is effected by heating the irradiated fiber under tension or non-tension at 800°–1,700° C. in ammonia gas stream. During the firing, polycarbosilane or polysilazane forming the fiber emanates easily volatile components by thermal polycondensation reaction, thermal cracking reaction, and nitriding reaction. The emanation or dissipation of the easily volatile components reaches to the maximum in a temperature range of 400°–600° C. As a result, the irradiated spun fiber is shrunk and caused to bend to assume a wave shape. Hence, the exertion of the tension on the fiber during the heating is particularly advantageous in that it prevents the bending of the fiber and improves the mechanical characteristics of the fired fiber. In order to prevent the shrinking and the formation of the wave shape of the fiber during the heating, an exertion of a tension power of substantially 0.001 5 kg/mm$^2$ attains a good result. An exertion of a tension power of less than 0.001 kg/mm$^2$ can not afford a sufficient tension on the fiber to prevent the sag thereof. In another aspect, in order to improve the mechanical characteristic properties of the fired fiber, an exertion of a tension power of substantially 5–10 kg/mm$^2$ achieves a good result. An exertion of a tension power of less than 5 kg/mm$^2$ can not improve the mechanical characteristic properties of the fired fiber, while an exertion of a tension power exceeding 10 kg/mm$^2$ on the fiber incurs an occasional severing of the fiber. Thus, a tension power of 0.001–10 kg/mm$^2$ on the fiber during the firing is preferable.

Flow rate of the ammonia gas stream in the firing step is preferably at least 50 ml/min. If the flow rate is less than 50 ml/min, the characteristic properties of the fiber at high temperatures is deteriorated, so that the flow rate of the ammonia is preferably 50 ml/min or more.

By the firing of the irradiated polycarbosilane fiber in the ammonia gas stream, inorganization reaction and nitriding reaction of the polycarbosilane fiber proceed concurrently from the temperature of about 500° C., and are completed at 800° C. If the complishing temperature is less than 800° C., carbon remains in the fiber and the inorganization reaction is insufficient. Therefore, the fiber has to be heated to at least 800° C. in the ammonia gas stream. The polycarbosilane fiber is converted to the continuous fiber composed of Si and N by the heat treatment of at least 800° C.

Also, in the case of firing the polysilazane fiber in the ammonia gas stream, inorganization reaction and nitriding reaction proceed concurrently from the temperature of about 500° C., and are completed at 800° C. Therefore, the fiber has to be heated to at least about 800° C. in the ammonia gas stream. Because polysilazane is an organic silicon high molecule compound composed mainly of Si-N skeleton structure, a compound consisting of Si and N is obtained even when the irradiated polysilazane fiber is fired in an inert atmosphere such as argon. However, in such a case, a large amount of carbon remains simultaneously in the fiber, which causes to deteriorate the characteristic properties of the fiber at high temperatures. For instance, if a polysilazane fiber produced and irradiated by an electron beam as in the later-described Example 4 is fired in an argon gas stream, a large amount of C. is intermingled in Si and N, and $\beta$-SiC crystal phase begins to appear from a temperature of 1,450° C., so that the strength of the fiber is decreased rapidly. From the above reason, also in the case of polysilazane, the irradiated fiber has to be fired in the ammonia gas stream.

Further, if the firing is effected in the ammonia gas stream at a temperature of at least 800° C., the characteristic properties such as, heat resistant property, of the continuous fiber composed of Si and N is improved.

The firing step at 800° C. or more may be effected in an inert gas atmosphere in lieu of ammonia gas stream.

Upper limit of the firing temperature is 1,700° C., because above this temperature the strength of the obtained fiber decreases rapidly.

A relation between the heating temperature of polycarbosilane (abbreviated as P.C.) fiber irradiated by an electron beam in an ammonia gas stream as described in the later-described Example 2 and the weight change of the polycarbosilane fiber due to thermal cracking, is shown in the attached FIG. 1. Similarly, the irradiated polycarbosilane fibers are heated at various temperatures in an ammonia gas steam, and the obtained fibers are subjected to chemical analysis, the results are shown in the following Table 1. The chemical analytical values are represented by atoms ratios of respective element taken the atoms number of Si as 1.

TABLE 1

| P.C. Fiber | | Empirical Formula |
| --- | --- | --- |
| non-fired | | Si $N_{0.00}$ $C_{1.91}$ $H_{4.68}$ $O_{0.00}$ |
| fired at | 400° C. | Si $N_{0.02}$ $C_{1.89}$ $H_{4.60}$ |
| | 500° C. | Si $N_{0.20}$ $C_{1.80}$ $H_{4.34}$ |
| | 600° C. | Si $N_{1.33}$ $C_{0.29}$ $H_{1.01}$ |
| | 800° C. | Si $N_{1.29}$ $C_{0.03}$ $H_{0.10}$ |
| | 1,000° C. | Si $N_{1.30}$ $C_{0.02}$ $H_{0.11}$ |
| | 1,200° C. | Si $N_{1.33}$ $C_{0.01}$ $H_{0.08}$ |
| | 1,400° C. | Si $N_{1.34}$ $C_{0.00}$ $H_{0.00}$ |

As seen from the above Table 1, the irradiated fiber not yet fired, consists of silicon, carbon and hydrogen, and does not contain nitrogen. If the fiber is heated in an ammonia gas stream, weight decrease of the fiber begins from near around 400° C., and the weight of the fiber decreases by about 30% until the heating temperature reaches to 700° C., as seen in FIG. 1. Meanwhile, as seen from the result of the chemical analysis, the analytical values show few change up to the heating temperature of 400° C., a few nitrogen is detected at 500° C., a rapid increase of nitrogen is seen at 600° C., while showing rapid decreases of carbon and hydrogen. Thereafter, carbon and hydrogen decrease slowly, and carbon is substantially disappeared and nitrization is completed, at 800° C. Also, IR absorption spectrum analysis was simultaneously put into practice, and the spectrum varied largely in a temperature range of 500°–600° C., showing a rapid progression of the inorganization reaction of the irradiated P.C. fiber in this temperature range.

As seen from the foregoings, if an irradiated polycarbosilane fiber is heated in an ammonia gas stream slowly, the inorganization reaction takes place rapidly at 500°–600° C. with concurrent introduction of nitrogen in the fiber, and carbon and hydrogen are diminished rapidly, and the nitriding reaction is substantially completed at 800° C., and the remaining small amounts of carbon and hydrogen are slowly diminished with the increase of the firing temperature, thereby to leave nitrogen and silicon exclusively in the fiber at 1,400° C.

A behavior of the irradiated polysilazane fiber, obtained by the procedure of Example 4, in thermal cracking by heating it in an ammonia gas stream, was similar to the case of the above-mentioned polycarbosilane fiber. However, there was seen a few difference in the weight change caused by the thermal cracking of the polycarbosilane fiber heated in the ammonia gas stream, namely, polysilazane fiber showed a larger weight residue percentage than polycarbosilane fiber by a few or several % at the stage of the heat treatment of up to 1,000° C.

As a result of the chemical analysis, it was found that the both inorganic fibers obtained from either of polycarbosilane and polysilazane contain occasionally the remaining H of an atoms ratio of H/Si>0.2, which remaining H can be decreased by elevating the firing temperature.

The inorganic continuous fiber produced by the method of the present invention as explained above, is substantially composed of Si and N and a wholly novel high purity and high strength inorganic silicon nitride continuous fiber not containing C.

The reason why the inorganic silicon nitride continuous fiber composed substantially solely of Si and N of the present invention has the high strength is because the fiber is constituted from an amorphous material composed of Si and N, fine $\alpha$-$Si_3N_4$ crystals, or fine $\alpha$-$Si_3N_4$ crystals uniformly distributed in the amorphous material, so that coarse grains, aggregation of grains, coarse pores or the like which causes local stress concentration is difficult to occur. The inorganic silicon nitride continuous fiber produced by the method of the present invention has a tensile strength of 140–400 $kg/mm^2$, an elastic modulus of 12–40 $ton/mm^2$, a specific gravity of 2.1–3.1 $g/cm^3$, an excellent insulation property, a specific resistance of $10^7$ $\Omega.cm$ or more, and a dielectric constant (or a dielectric percentage relative to that in air of 6.0–9.5. Further, the inorganic silicon nitride continuous fiber has excellent heat resistant, thermal shock resistant, oxidation resistant, alkali resistant and acid resistant properties, as well as an excellent corrosion resistant property against to molten non-ferrous metals excluding copper.

The inorganic silicon nitride continuous fiber composed substantially solely of Si and N is extremely useful not only to a reinforcing fiber for fiber-reinforced metals or fiber-reinforced ceramics, but also to fibers of the above properties for insulation materials, dielectric materials, and heat resistant materials.

Description of the Preferred Embodiment

Hereinafter, the present invention will be explained in more detail with reference to the preferred embodiments.

Example 1

2.5 liters of xylene anhydride and 400 g of sodium are charged in a 5 liters capacity three necked flask, heated in a nitrogen gas stream to the boiling point of xylene anhydride, and titrated by 1 liter of dimethyldichlorosilane in 1 hour. After the completion of the titration, the content is heated under reflux for 10 hours to form precipitates. The precipitates are filtered, washed first with methanol and then with water to obtain 420 g of polydimethylsilane in white powder form. 250 g of polydimethylsilane thus obtained is charged in a 1 liter capacity autoclave of induction rotary type. The autoclave is evacuated by a vacuum pump, filled with an argon gas of 1 atm pressure, and sealed. The content in the autoclave is heated to 470° C., while agitating, and held at 470° C. for 14 hours. After the completion of the reaction, the pressure in the autoclave is about 105 $kg/cm^2$. Thereafter, the autoclave is cooled to room temperature, and the reaction products are taken out from the autoclave in a form of a solution in n-hexane. The solution is filtered, and subjected to a vacuum distillation to remove low molecular weight products having boiling points of up to 280° C./1 mmHg, to obtain 147 g of polycarbosilane of a number average molecular weight of 1,800 of light brown solid state.

Thus obtained polycarbosilane is melted in a nitrogen gas stream by heating at about 335° C. in a spinning apparatus, and spun to a fiber in air from a die of an orifice diameter of 300 $\mu m$. The spinning speed is 500 m/min, and the diameter of the fiber is about 18 $\mu m$. The fiber is sealed in a glass tube in vacuo, and irradiated under non-tension state by a $\gamma$-ray of $1.0 \times 10^8$ rad. The irradiated fiber is taken out from the glass tube, fired by heating under non-tension state in an ammonia gas stream of a flow rate of 150–200 ml/min from room temperature to 1,300° C. at a temperature-raising rate of 100° C./h, held at 1,300° C. for 1 hour, and left to cool to room temperature to obtain a non-colored transparent fiber. The fiber has a diameter of about 15 $\mu m$, a tensile strength of 200 $kg/mm^2$, and an elastic modulus of 23 $ton/mm^2$. From analytical values and an X-ray diffraction pattern, it was ascertained that the obtained fiber is an inorganic amorphous silicon nitride continuous fiber composed of Si and N, and does not have the C component.

The fiber obtained in the similar manner at an elevated firing temperature of 1,400° C., has an X-ray diffraction pattern wherein peaks presumably relating to $\alpha$-$Si_3N_4$ appeared at 20.5°, 22.9°, 26.5°, 31.0°, 35.0°, 41.9°, 43.5°, 57.7°, 62.5°, 64.9°, 69.5° and 72.8° on 2$\theta$, so that the fiber is ascertained to consist of fine $\alpha$-$Si_3N_4$ crystals.

Example 2

Figure 2:
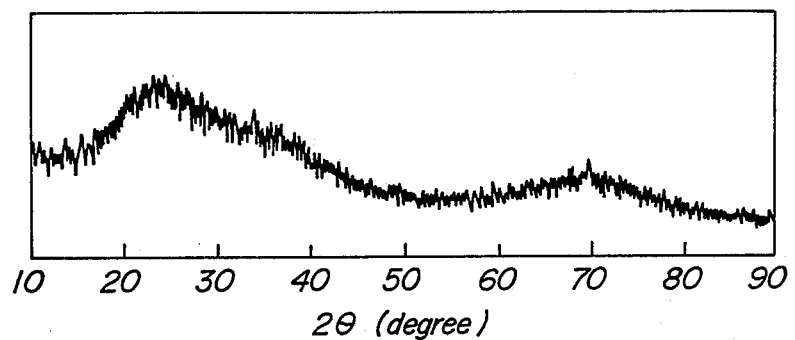
FIG. 2 is an X-ray diffraction pattern of the continuous inorganic fiber obtained by firing at 1,300° C. in Example 2.
Figure 3:
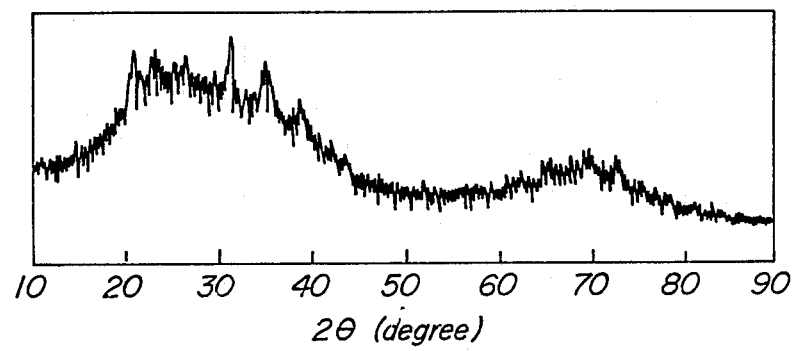
FIG. 3 is an X-ray diffraction pattern of the continuous inorganic fiber obtained by firing at 1,400° C. in Example 2.

The procedure of Example 1 is repeated to obtain polydimethylsilane. 300 g of polydimethylsilane is charged in a 3 liters reaction vessel provided with a reflux condenser, heated slowly to 450° C. under agitation, and held at 450° C. for 15 hours to perform the reaction. After cooled, the reaction products are taken out from the reaction vessel in a form of a solution in xylene, filtered, and heated to 140° C. to evaporate xylene from the solution to obtain 162 g of polycarbosilane of a number average molecular weight of 1,300 of a solid state. The polycarbosilane is solved in benzene to yield a 50% solution, and the solution is spun to a fiber from a spinning die orifice of a diameter of 200 μm by a dry spinning method at a spinning speed of 200 m/min and a die temperature of 50° C. to obtain a fiber of a diameter of about 15 μm. The fiber is irradiated by an electron beam of $7.5 \times 10^8$ rad under non-tension in a helium gas stream. The irradiated fiber is fired by heating to 900° C. under non-tension in an ammonia gas stream of a flow rate of 150-200 ml/min at a temperature-raising rate of 100° C./h from room temperature, and then the environmental atmosphere of the fiber is replaced by an argon gas stream, and the fiber is fired by heating to 1,300° C. from 900° C. at a temperature-raising rate of 100° C./h, held at 1,300° C. for 1 hour, and cooled to room temperature to obtain a non-colored transparent fiber. Thus, obtained fiber has a diameter of about 12 μm, a tensile strength of 250 kg/mm$^2$, and an elastic modulus of 24 ton/mm$^2$. The obtained fiber is subjected to a chemical analysis and an X-ray diffraction measurement. As a result, it was ascertained that the fiber obtained by firing at 1,300° C. is an inorganic amorphous silicon nitride continuous fiber composed solely of Si and N, and a fiber obtained in the similar manner at an elevated firing temperature of 1,400° C. consists of fine crystals of α-Si$_3$N$_4$. X-ray diffraction patterns of the fibers obtained by firing at 1,300° C. and 1,400° C. are respectively shown in the attached FIGS. 2 and 3.

Example 3

A polycarbosilane fiber of a diameter of 15 μm is produced in the same manner as in Example 2. The fiber is irradiated by an electron beam of $7.5 \times 10^8$ rad under a tension power of 0.05 kg/mm$^2$ in a helium gas stream. The irradiated fiber is heated to 900° C. from room temperature at a temperature-raising rate of 100° C./h under a tension power of 8 kg/mm$^2$ in an ammonia gas stream of a flow rate of 150-200 ml/min. And then, the environmental atmosphere of the fiber is replaced by an argon gas stream. Thereafter, the temperature is raised from 900° C. to 1,300° C. at a temperature-raising rate of 100° C./h, held at 1,300° C. for 1 hour, and left to cool to room temperature to obtain a non-colored transparent fiber. The fiber has a diameter of about 10.5 μm, a tensile strength of 320 kg/mm$^2$, and an elastic modulus of 29 ton/mm$^2$. These strength and elastic modulus exhibit far higher values than those of the fiber irradiated and fired under non-tension states, showing the advantageous effect of the exertion of tension power on the fiber during the irradiation and the firing steps over the improvement of the mechanical characteristic properties of the inorganic silicon nitride continuous fiber.

Thus obtained fiber is subjected to a chemical analysis and an X-ray diffraction measurement. As a result, it was ascertained that the fiber obtained by firing at 1,300° C. is an inorganic amorphous silicon nitride continuous fiber composed of Si and N, and a fiber obtained in the similar manner at an elevated firing temperature of 1,400° C. consists of fine crystals of α-Si$_3$N$_4$, just similarly as in Example 1.

Example 4

An inner atmosphere of a circulation type reaction apparatus equipped with a reaction cylinder, an electric furnace, a cooler, a circulation pump, and a collection flask, is replaced by a nitrogen gas. 100 g of tetramethylsilane is charged in the reaction apparatus, and the electric furnace is heated so that the reaction cylinder reaches to a temperature of 770° C. Subsequently, tetramethylsilane vapor (b.p, of tetramethylsilane is 27° C., and the vapor pressure thereof is sufficiently high at room temperature) is repeatedly flowed into the reaction cylinder by the circulation pump to perform the reaction for 24 hours. After the completion of the reaction, a liquidous product in the collection flask is cooled to room temperature, taken out in a form of a solution in n-hexane from the reaction apparatus, filtered, and distilled under reduced pressure to remove low molecular weight components having b.p. of up to 200° C./mmHg to obtain 6.8 g of red brown solid polycarbosilane of a number average molecular weight of 870.

The polycarbosilane is melted by heating to about 260° C. in a nitrogen gas stream in a spinning apparatus, and spun in air to a fiber from a die orifice of a diameter of 300 μm with a spinning speed of 150 m/min. A fiber of a diameter of about 22 μm is obtained. Thus obtained fiber is irradiated under non-tension state in vacuum by an electron beam of $1.0 \times 10^9$ rad. The irradiated fiber is fired by heating to 1,300° C. at a temperature-raising rate of 100° C./h under non-tension state in an ammonia gas stream of a flow rate of 150-200 ml/min, held at 1,300° C. for 1 hour, and left to cool to room temperature to obtain a non-colored transparent fiber. The fiber has a diameter of about 17 μm, a tensile strength of 210 kg/mm$^2$, and an elastic modulus of 19 ton/mm$^2$. The fiber is subjected to a chemical analysis and an X-ray diffraction measurement. As a result, it was ascertained that the fiber is an inorganic amorphous silicon nitride fiber composed of Si and N. A fiber obtained in the same manner but at an elevated firing temperature of 1,400° C. is ascertained to consist of fine crystals of α-Si$_3$N$_4$, similarly as in the case of Example 2, but the crystal grain size of the precipitated α-Si$_3$N$_4$ is smaller than that of Example 2.

Example 5

2.5 liters of benzene anhydride and 500 g of dimethyldichlorosilane are charged in a 5 liters three-necked flask, and the atmosphere in the flask is replaced by nitrogen. Then, a mixed gas of nitrogen gas (purity 99.99%) and ammonia gas (purity 99.999%) is flowed into the flask, while agitating the benzene solution in the flask. At this stage, dimethylchlorosilane in the benzene solution reacts with the ammonia gas by an exothermic reaction to generate heat, so that the flask is water cooled to maintain the benzene solution to 30° C. In this way, dimethyldichlorosilane is completely reacted with ammonia, while flowing the nitrogen gas and the ammonia gas into the flask at 30° C. and stirring the solution in the flask for 9 hours. After the reaction, formed white precipitates of NH$_4$Cl are removed by filtering. The filtrate benzene solution is charged in a 5 liters three-necked flask equipped with a reflux condenser, heat refluxed for 3 hours, while agitating in a nitrogen gas stream, to perform the reaction. After the reaction, the benzene solution is charged in a three-necked flask equipped with a Liebig condenser, and heated to 80° C. to remove benzene. Thus, 120 g of hexamethylcyclotrisilazane [(CH$_3$)$_2$SiNH]$_3$ which is a liquid state at room temperature, and 105 g of octamethylcyclotetrasilazane [(CH$_3$)$_2$SiNH]$_4$ which is white crystal at room temperature, are obtained. Among the silazanes thus obtained, 100 g of hexamethylcyclotrisilazane [(CH$_3$)$_2$SiNH]$_3$ and 1 g of potassium hydroxide KOH are charged in a 500 ml three-necked flask equipped with a reflux condenser, heated to 290° C. while agitating in a nitrogen gas stream, held at 290° C. for 3 hours to perform a reaction, and subsequently cooled. After cooled, the reaction product is taken out as a solution in xylene, filtered, heated to 260° C. in a nitrogen atmosphere of 20 Torr, and removed of xylene and low molecular weight products to obtain 62 g of non-colored solid polysilazane of a number average molecular weight of about 1,500.

The polysilazane is melted by heating to about 280° C. in a nitrogen gas stream in a spinning apparatus, and spun into a fiber in air from an orifice of a diameter of 300 μm at a spinning of 600 m/min. A fiber of a diameter of about 12 μm is obtained. The fiber under non-tension is irradiated in vacuum with an electron beam of $1.5 \times 10^9$ rad.

The irradiated fiber is heated to 1,300° C. under non-tension state in an ammonia gas stream of a flow rate of 150-200 ml/min at a temperature-raising rate of 100° C./h, held at 1,300° C. for 1 hour, and left to cool to room temperature to obtain a non-colored transparent fiber. The fiber has a diameter of about 10 μm, a tensile strength of 250 kg/mm$^2$, and an elastic modulus of 18 ton/mm$^2$. The fiber is subjected to a chemical analysis and an X-ray diffraction measurement to ascertain that it is an inorganic amorphous silicon nitride continuous fiber composed of Si and N. A fiber obtained in the similar manner at an elevated firing temperature of 1,400° C. does not show a large change on an X-ray diffraction pattern, indicating that the fiber is an inorganic amorphous silicon nitride continuous fiber composed of Si and N, similarly as in the case of the fiber obtained by firing at 1,300° C.

Example 6

100 g of octamethylcyclotetrasilazane [(CH$_3$)$_2$SiNH]$_4$ obtained as in Example 5, and 1 g of potassium hydroxide KOH, are charged in a 500 ml three-necked flask equipped with a reflux condenser, heated under agitation to 310° C. in a nitrogen gas stream, performed a reaction at 310° C. for 3.5 hours, and cooled. After cooled, the reaction products are taken out from the flask as a form of a solution in xylene, filtered, and heated to 270° C. in a nitrogen gas atmosphere of 0.3 Torr to remove xylene and low molecular weight products, thereby to obtain 58 g of a light brown transparent solid polysilazane of a number average molecular weight of about 2,000.

The polysilazane is melted by heating to about 310° C. in a nitrogen gas stream in a spinning apparatus, and spun to a fiber in air from an orifice of a diameter of 290 μm at a spinning speed of 220 m/min. The obtained fiber having a diameter of about 19 μm is irradiated under non-tension with an electron beam of $5.0 \times 10^8$ rad in an argon gas stream. The irradiated fiber is fired by heating to 1,300° C. from room temperature at a temperature-raising rate of 100° C./h under tension of 50 g/mm2 in an ammonia gas stream of a flow rate of 150-200 ml/min, held at 1,300° C. for 1 hour, and left to cool to room temperature to obtain a non-colored transparent fiber. The fiber has a diameter of about 16 μm, a tensile strength of 210 kg/mm$^2$, and an elastic modulus of 20 ton/mm$^2$. Further, a fiber is also produced in the same manner at an elevated firing temperature of 1,400° C. The obtained fibers are subjected to a chemical analysis and an X-ray diffraction measurement. As a result, the both fibers obtained by firing at 1,300° C. or 1,400° C. are found to be inorganic amorphous silicon nitride continuous fiber composed of Si and N, similarly as in the case of Example 5.

Although the present invention has been explained with specific values and embodiments, it is of course apparent to those skilled in the art that various changes and modifications are possible without departing the broad aspect and spirit of the present invention as defined in the appended claims.

What is claimed is:

1. An inorganic silicon nitride continuous fiber consisting essentially of an amorphous material composed of Si and N, crystals of δ-Si$_3$N$_3$, or crystals of α-Si$_3$N$_4$ uniformly distributed in the amorphous material composed of Si and N, wherein said fiber has a tensile strength of 140 to 400 kg/mm$^2$, an elastic modulus of 12 to 40 ton/mm$^2$, a density of 2.1 to 3.1 g/cm$^3$, a specific resistivity of at last $10^7$ Ω.cm, and a dielectric constant of 6.0 to 9.5.

* * * * *